United States Patent Office 3,237,035
Patented Feb. 22, 1966

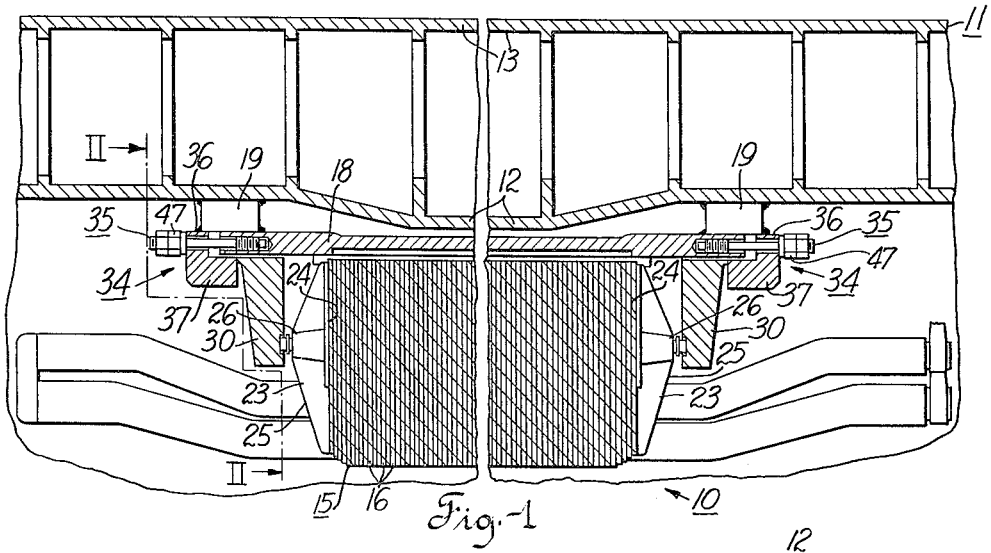
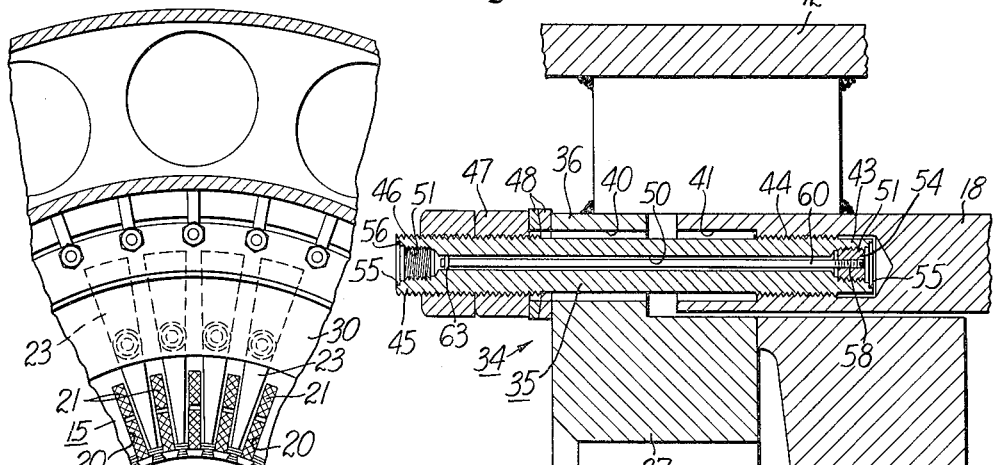
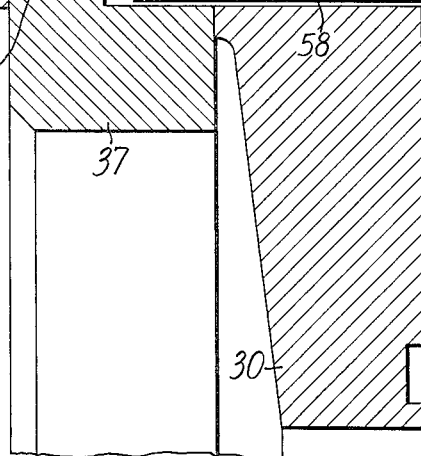

3,237,035
LOAD INDICATING STUDS FOR DYNAMO-ELECTRIC MACHINE CORES
Jack H. Hoffmann, West Allis, Wis., assignor to Allis-Chalmers Manufacturing Company, Milwaukee, Wis.
Filed Mar. 2, 1962, Ser. No. 176,947
3 Claims. (Cl. 310—217)

This invention relates generally to load indicating clamping studs. More specifically this invention relates to a clamping stud having means for checking the pressure on the stator core laminations of dynamoelectric machines.

In large dynamoelectric machines such as turbogenerators, it is important to maintain a uniform relatively high pressure on the stator core laminations. If the laminations become loose due to lack of pressure or non-uniformly applied pressure, the laminations tend to vibrate thereby creating excessive noise. The vibrations tend to further loosen the core thereby increasing the amplitude of vibration of the laminations which in turn increases the volume of noise produced until it reaches an unacceptable level.

In the past, it was common practice to check the pressure on the stator core by individually loosening each core stud to determine its relaxed or unstressed length. This was done by measuring, with a depth micrometer, the distance between the end of the stud and the bottom of an axial hole in the center of the stud. Then the nuts on each of the 36 or so studs on each end of the core assembly were retightened. The studs were stretched to a predetermined length to exert an equal amount of pressure. This cycle was repeated on each stud individually, so as not to relax the entire clamp force on the core. This procedure is very time consuming, exceedingly expensive and frequently does not succeed in balancing the pressure on the core.

This invention overcomes the problems outlined above by providing each core stud with means for easily measuring the stress in the stud and hence the pressure the stud is applying to the core. By measuring the stress on each stud you can determine directly which studs have to be tightened and how much it has to be tightened to balance the pressure on the core and bring the overall pressure up to the desired level.

Therefore, it is the object of this invention to provide a new and improved load indicating clamping stud.

Another object of this invention is to provide a new and improved load indicating core stud for dynamoelectric machines.

Another object of this invention is to provide a dynamoelectric machine having improved means for determining core pressure.

Another object of this invention is to provide a device for determining the pressure applied by each stud on the core of a dynamoelectric machine.

Another object of this invention is to provide a new and improved means for balancing core pressure.

Other objects and advantages will be apparent from the following description when read in connection with the accompanying drawings, in which:

FIG. 1 is a partial cross sectional view of a stator of a turbine generator;

FIG. 2 is an end view of a stator core taken along lines II—II of FIG. 1; and

FIG. 3 is an enlarged sectional view of the core clamping stud of this invention.

Referring more specifically to the drawings by characters of reference, the core studs of this invention are illustrated in connection with a stator 10 of a turbine generator. The stator comprises a cylindrical shell 11 having an inner and outer wrapper 12 and 13. The stator core 15 is made up of a plurality of iron laminations 16 in the usual manner. The core is connected to a series of arcuately spaced mounting bars 18 which are in turn connected to the inner wrapper 12 by means such as the blocks 19 which are welded to both the bars and the inner wrapper. The inner portion of the core 15 is provided with a plurality of arcuately spaced winding slots 20 having windings 21 positioned therein in the usual manner.

A plurality of finger plates 23 are positioned at either end of the core 15. These finger plates 23 are positioned intermediate adjacent winding slots 20 and extend radially from near the bore of the core to its outer periphery. The inner surface 24 of the finger plates 23 lie flat against the end lamination of the core. The outer surface 25 can be of any suitable configuration but preferably as shown in FIG. 1 the surface of the finger plates 23 comes to a point 26 about midway between its ends. An annular spring pressure ring 30 is provided adjacent the ends of the core and is positioned to engage each finger plate. As shown in the drawings the ring engages the finger plate 23 where they come to a point. The outer periphery of the pressure ring extends to a position near the mounting bar 18 of the core.

An annular clamp 34 is used to transmit force from the core studs 35 of this invention to the lamination 16 through finger plates 23. The annular clamp 34 is L-shaped in cross section taken on a plane through its axis. The outer flange 36 of the clamp 34 is positioned radially inward from the inner wrapper 12 and axially outward from the end of bars 18. The flange 36 has a series of arcuately spaced apertures or holes 40 positioned therein for receiving the core studs 35 of this invention. The inner projection or flange 37 on the annular clamp 34 is radially inward of the bars 18 and extends axially inward toward the core of the stator and abuts the outer peripheral portion of the spring disk 30.

The core stud 35 is a generally cylindrical member that extends through the apertures 40 in the clamp 34 into aligned apertures 41 in the end of the mounting bars 18. The inner end 43 of the core stud 35 has an externally threaded portion 44 that engages the internally threaded portion of apertures 41. The outer end 45 of the stud has an externally threaded portion 46 for receiving a nut 47 which is tightened down on the stud to apply pressure to the stator core through the clamp 34, the spring disk 30 and the finger plate 23.

It may be desirable in some applications to insert a spring washer 48 between the nut 47 and the clamp 34 to get a more uniform application of pressure against the spring disk 30.

A bore 50 extends longitudinally through the entire length of the core stud 35. The stud is made symmetrical for ease in manufacture and use but symmetry of the stud is not essential to this invention. This bore 50 is enlarged at either or both ends as shown at 51 and threaded internally to receive a suitable plug 54 which will be explained in detail later. A recess 55 is cut into the surface at each end of the core studs 35. The recess 55 has a flat reference surface 56 perpendicular to the axis of the stud 35 from which depth measurements can be made with a suitable micrometer.

The plug 54 is threaded externally to engage the enlarged threaded portion 51 of the bore 50 and has an internally threaded bore portion 58 for receiving a measuring rod 60. The plug is positioned in the enlarged bore portion 51 of the inner end of the stud with its threaded bore 58 facing outward. The measuring rod 60 is positioned within the bore 50 of the stud 35 and has one end threaded for operatively engaging the threaded bore 58 of plug 54. The rod 60 extends through the bore 50 to near the reference surface 56 at the other end of the stud. The plug 54 is adjustably mounted in the stud 35 and the rod is adjustably mounted in the plug 54 so that the distance between the end of the rod and the reference surface 56 can be set at a specific distance in the unstressed condition of the stud. A thin silicone rubber band 63 surrounds the nonthreaded end of the measuring rod 60 near the open end of the smaller portion of the bore 50. This band 63 serves to keep the rod centered within the bore 50 of the core stud and will dampen any vibration of the rod.

The amount of pressure being applied to the laminations by each stud is proportional to the stress in the core stud. The stress in the core stud can be measured by measuring the elongation of the core stud due to tightening the nut 47 on the stud. Since the rod 60 is not stressed or deformed when the nut 47 is tightened on the stud a measure of the elongation of the stud can be obtained by measuring the distance between the flat reference surface 56 on the stud and the free end of the measuring rod 60 before and after the nut has been tightened on the stud. This measure of length differential is the elongation of the stud and can then be interpolated to determine the amount of stress in the stud and hence the pressure being applied to the core by that stud. Preferably the rod 60 is originally assembled in the stud at a calibrated distance from the reference surface 56, which effectively provides a specific reference dimension indicating the unstressed condition of the stud. This calibrated distance is duplicated in every stud for simplicity in clamping the core to the proper pressure.

In operation after the core has been assembled with the finger plates 23, spring disk 30 and clamping ring 34 and core studs 35 in position, the nuts 47 on the core studs 35 are tightened down to a firm position in which they are snug against the spring washer but applying substantially no pressure on the core itself. All the nuts are tightened down to substantially the same degree. Then a measurement is made in each core stud to determine the length between its measuring surface 56 and the free end of its measuring rod 60. Then each nut is tightened down until the core stud has elongated the desired distance. When the desired length differential between the reference surface and the rod has been achieved it will be known that the predetermined desired pressure is being applied by the stud to the core. This procedure is followed with all of the studs on the core. Then each stud is rechecked to see that it is still applying the predetermined desired pressure to be sure that the pressure on the core is balanced.

If the generator is shut down at any time after it has been in use, the distance between the rod 60 and the reference surface 56 can be rechecked to determine whether or not the stud is still applying the same pressure that it was applying initially. If there is any deviation then the nuts can be adjusted on the core studs to balance out the pressure being applied by each stud and bring the overall pressure up to the desired level. In other words, this is a means of rebalancing the pressure being applied to the stator core.

Although but one embodiment of this invention has been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. In combination with a dynamoelectric machine having a laminated core, mounting bars spaced about the outer periphery of said core and extending axially beyond the ends of said core, said bars having threaded bores at either end, finger plates positioned adjacent the ends of the core with a flat surface engaging the end laminations of said core, the outer surface of said finger plates defining a raised area intermediate the ends of the finger plate, an annular disk positioned radially inward from said bars and engaging the raised area of said finger plates, an annular clamp, said clamp having an outer flange positioned adjacent the ends of said bars and an inner flange in abutting relationship with the radially outer portion of said disk, said outer flange having arcuately spaced apertures aligned with said threaded bores in said bars, and a load indicating stud for each of said bars, said studs comprising a cylindrical member extending through one of said apertures and engaging a threaded bore in one of said bars, said member having a bore extending axially therethrough, a reference surface formed at the outer end of said member, a rod connected to the other end of said member and extending through said bore in said member toward said reference surface, and means operatively engaging said member to apply pressure on said core through said clamp, said disk and said plates whereby the pressure being applied to said core by said stud can be determined by measuring the length differential between said reference surface and the extended end of said rod.

2. In combination with a dynamoelectric machine having a laminated core, mounting bars spaced about the outer periphery of said core and extending axially beyond the ends of said core, said bars having threaded bores at either end, finger plates positioned adjacent the ends of the core with a flat surface engaging the end laminations of said core, the outer surface of said finger plates defining a raised area intermediate the ends of the finger plate, an annular disk positioned radially inward from said bars and engaging the raised area of said finger plates, an annular clamp, said clamp having an outer flange positioned adjacent the ends of said bars and an inner flange in abutting relationship with the radially outer portion of said disk, said outer flange having arcuately spaced apertures aligned with said threaded bores in said bars, and a load indicating stud for each of said bars, said studs comprising a cylindrical member extending through one of said apertures and engaging a threaded bore in one of said bars, said member having a bore extending axially therethrough, a reference surface formed at the outer end of said member, a rod connected to the inner end of said member and extending through said bore in said member toward said reference surface, the outer end of said member being externally threaded and a nut operatively engaging said threaded portion to apply pressure on said core through said clamp, said disk and said plates whereby the pressure being applied to said core by said stud can be determined by measuring the length differential between said reference surface and the extended end of said rod.

3. In combination with a dynamoelectric machine having a laminated core, mounting bars spaced about the outer periphery of said core and extending axially beyond the ends of said core, said bars having threaded bores at either end, finger plates positioned adjacent the ends of the core with a flat surface engaging the end laminations of said core, the outer surface of said finger plates defining a raised area intermediate the ends of the finger plate, an annular disk positioned radially inward from said bars and engaging the raised area of said finger plates, an annular clamp, said clamp having an outer flange positioned adjacent the ends of said bars and an inner flange in abutting relationship with the radially outer portion of said disk, said outer flange having arcuately spaced apertures aligned with said threaded bores in said bars, and a load indicating stud for each of said bars, said studs comprising a cylindrical member extending through one of said apertures and engaging a threaded bore in one of said bars, said member having a bore extending axially therethrough, a reference surface formed at the outer end of said member and a plug connected to the inner end of said member, a rod connected to said plug and extending through said bore in said member toward said reference surface, the outer end of said member being externally threaded and a nut operatively engaging said threaded portion to apply pressure on said core through said clamp, said disk and said plates whereby the pressure being applied to said core by said stud can be determined by measuring the length differential between said reference surface and the extended end of said rod.

References Cited by the Examiner

UNITED STATES PATENTS

| | | | |
|---|---|---|---|
| 1,674,876 | 6/1928 | Thompson | 310—217 |
| 2,413,797 | 1/1947 | Stone | 85—62 |

ORIS L. RADER, *Primary Examiner.*

MILTON O. HIRSHFIELD, *Examiner.*